United States Patent [19]

Kugler

[11] Patent Number: 4,894,300
[45] Date of Patent: Jan. 16, 1990

[54] SEALED MAINTENANCE-FREE LEAD-ACID STORAGE BATTERY

[75] Inventor: Wolgang Kugler, Ortenberg, Fed. Rep. of Germany

[73] Assignee: Accumulatorenfabrik Sonnenschein GmbH, Budingen, Fed. Rep. of Germany

[21] Appl. No.: 234,077

[22] Filed: Aug. 19, 1988

[30] Foreign Application Priority Data

Aug. 20, 1987 [DE] Fed. Rep. of Germany ....... 3727763

[51] Int. Cl.⁴ .............................................. H07M 6/14
[52] U.S. Cl. ..................... 429/190; 429/163; 429/179
[58] Field of Search ............... 429/53, 82, 163, 179, 429/190

[56] References Cited

U.S. PATENT DOCUMENTS

| | | | |
|---|---|---|---|
| 3,711,332 | 1/1973 | Bastacky | 429/190 X |
| 4,391,036 | 7/1983 | Kishimoto et al. | 429/190 X |
| 4,687,718 | 8/1987 | Chreitzberg et al. | 429/190 |
| 4,751,154 | 6/1988 | Binder et al. | 429/53 |

Primary Examiner—Stephen J. Kalafut
Attorney, Agent, or Firm—Shlesinger Fitzsimmons Shlesinger

[57] ABSTRACT

The invention is directed to a sealed, maintenance-free lead-acid storage battery of high capacity employing a thixotropic sulfuric acid gel as the electrolyte.

In order to permit horizontal mounting without incurring the risk of escaping sulfuric acid during the charging process, the lower portion of the free gas space between electrode plates (1, 2) and housing lid (7) including the positive terminal (3) is filled with foamed material (9) which is preferably separated by means of a parting angle piece (10, 11) from the upper free gas space (6) including a pressure relief valve (8).

9 Claims, 1 Drawing Sheet

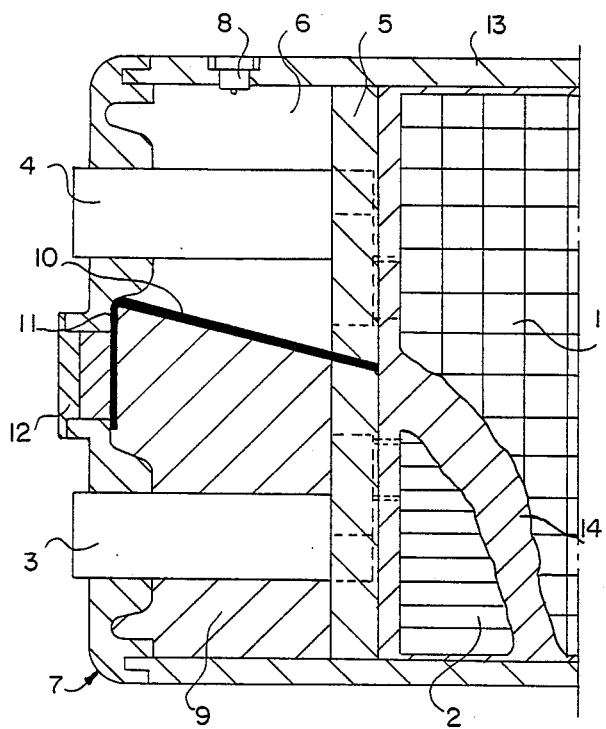

SEALED MAINTENANCE-FREE LEAD-ACID STORAGE BATTERY

The present invention concerns a sealed, maintenance-free lead-acid storage battery as specified in the preamble of claim 1.

CH-PS No. 391,807 discloses a lead-acid storage battery which is position-insensitive, sealed during operation and substantially maintenance-free, said storage battery employing a thixotropic sulfuric acid gel and being intended for normal, i.e. not excessively large outside dimensions. The difficulty of introducing thixotropic gel between the electrode plates prior to solidification of the gel has set a limit as to outside dimensions, especially the height of the electrodes. Therefore the upper capacity limit was approximately 20 Ah. This obstacle was eliminated by the subject matter of DE-PS No. 3,041,953, in which a specific charge-discharge characteristic, a specific filling technique and a temporary electrochemical bonding of sulfuric acid in the active materials of the electrode plates permits feeding of an electrolyte, which in operation is of gel-like substance, irrespective of the plate dimensions.

It has been found, however, that such high lead-acid storage batteries are less position-insensitive than normal-sized or small-sized lead-acid storage batteries. During the charging process a certain amount of liquid sulfuric acid is formed within the free space on top of the electrode plates, said amount being negligibly small in case of smaller plate dimensions and remaining within the gas space. But in case of the distinctly larger, high lead-acid storage batteries substantial amounts of liquid sulfuric acid are formed during the charging operation, and with the storage battery mounted horizontally such sulfuric acid may reach the pressure relief valve and may be ejected to the atmosphere in case of overpressure.

US-PS No. 4,603,093 discloses a horizontally mounted lead-acid storage battery with horizontal electrode plates, in which the terminals, however, are led out from the top as usual, and the individual electrode plates have usual, i.e. relatively short, dimensions and are partitioned by commonly used separators. The patent is silent about any special gel electrolyte. The system is intended to provide for higher density of energy and longer life, the latter being achieved by negative electrodes having a higher capacity than the positive plates.

The present invention is based on the problem of configuring a sealed, maintenance-free, high-capacity lead-acid storage battery in accordance with the preamble of claim 1 in such a way that a horizontal arrangement is made possible without the risk of escape of sulfuric acid. In accordance with the present invention the specified problem is solved by the characterizing features of claim 1. Further improvements of the invention have been claimed in the subclaims.

The solution resides in a specific horizontal arrangement and in filling the lower portion of the free gas space with electrolyte-resistant and electrolyte-impermeable material, especially by foam-filling with single-component polyurethane which hardens only by air moisture and is therefore freely movable for a prolonged period of time. Suitable materials are, for example, structural or sealing foams used in construction industry. Under certain circumstances two-component foam may also be suitable provided it does not harden too quickly so as not to penetrate into all cavities of the free space adjacent the gel layer. Such materials are foams used for packaging and foams which are processed by centrifugal casting.

In order to permit a defined separation of the material at the bottom and especially a limitation of the pressure developed during foaming, a parting angle piece is inserted as upper boundary of the filler material.

During charging, a certain amount of liquid sulfuric acid accumulates on top of this material, while this is impossible in the lower portion. Preferably, the parting angle piece is rearwardly downwardly inclined towards the gel layer so that the liquid sulfuric acid may rapidly flow back to the gel layer during the discharging process, when it is again absorbed by the gel or the electrode plates, respectively. The ratio between foam-filled portion and free upper gas space must be selected in such a way that sufficient space remains for the liquid sulfuric acid and the developing gases and that only gas and no liquid sulfuric acid will exit from the gas pressure relief valve provided at the top. This value is most favourable at a filling ratio in the range of 50 to 70% by volume, preferably c.60% by volume. In that case only a correspondingly reduced amount of liquid sulfuric acid can exit from the area of the gel layer facing the free gas space, such amount being unable to reach the vicinity of the pressure relief valve.

It is preferred that the plates are vertical, but basically it is also possible to provide horizontal plates. The positive electrode plates may be tube-type or grid plates while the negative electrodes may be grid plates.

It is known from DE-PS No. 1,070,708 to apply a filler material of cellular rubber or expandable plastic between the electrodes and to the entire free space of the cell housing, whereafter solidification occurs. Here, the surfaces of the positive electrodes are to be covered by an oxygen-resistant layer such as glass wool. DE-PS No. 1,936,472 discloses the interconnection of structural members of an electric lead-acid storage battery by means of a hollow space into part of which an expandable thermoplastic composition containing an expanding agent is injected which subsequently completely fills the hollow space due to its expanding pressure.

For many applications, horizontal mounting offers considerable advantages, in particular much space can be saved for instance in emergency power supply systems, on mounting in vehicles etc. It is therefore possible to mount such storage battery systems having a high capacity of about 200 to 1500 Ah in a more or less accessible fashion wherever there is available space, and maintenance will not be required for the whole life of about 15 years. Previous maintenance-free, position-insensitive storage batteries have been limited to capacities of up to about 20 Ah.

An embodiment of the invention is illustrated in the drawing.

The single drawing is a longitudinal section through a horizontal lead-acid storage battery.

The illustrated left-hand end of the lead-acid storage battery is defined by a housing 13, while the right-hand side illustrates part of a negative electrode plate 1 and to the rear thereof a positive electrode plate 2 separated therefrom by a separator 14. Both electrode plates are illustrated in horizontal position but with the lateral edge facing towards the top. All of the positive electrode plates of the illustrated lead-acid storage battery or the illustrated electrochemical cell, respectively, are interconnected and led out through the housing lid 7 via the positive terminal 3. Likewise, all of the negative electrode plates 1 are interconnected and led out via the negative terminal 4 through the housing lid 7. The positive terminal 3 is disposed in the lower portion of the free gas space 6, while the negative terminal 4 is disposed symmetrically oppositely in the upper portion of the free gas space 6. In the upper part of the housing 13 the pressure relief valve 8 is disposed which, when a predetermined internal pressure is exceeded, opens to release gas to the atmosphere. By the way, this pressure relief valve could appropriately also be provided in the upper portion of the housing lid 7. As left-hand boundary of the positive electrode plates 2 and the negative electrode plates 1, which are disposed in alternating relationship, a gel layer 5 is provided through which the connecting lugs of the various electrode plates are passed.

Slightly above the central portion of the free gas space 6 a parting angle piece 10 is provided which is rearwardly and downwardly inclined by about 10° towards the electrode plates and immersed in the gel layer 5. The forward boundary of the parting angle piece 10 is constituted by a vertical arm 11 which leaves an opening for feeding gel and injecting cellular plastic through the feeder closure 12. The parting angle piece 10 extends across the entire width of the free gas space 6 and thereby forms an upper boundary for the cellular plastic which expands under pressure and contacts all of the wall surfaces inclusive of the gel layer 5.

Since the filler material 9 is not only resistant to acid and therefor also to electrolyte, but also has a closed-cell structure and is thus impermeable to electrolyte, it is impossible for liquid electrolyte, i.e. liquid sulfuric acid, to segregate in this area during charging; segregation of electrolyte can only take place above the parting angle piece 10, so that considerably less liquid electrolyte is produced. Due to the inclined configuration this electrolyte returns towards the gel in a subsequent discharge process and is absorbed again thereby. The pressure relief valve 8 provided on top will not contact the liquid sulfuric acid so that no sulfuric acid will escape to the outside.

At the side of the negative electrode plate 1, small portions of the separator 14 have been illustrated in the drawing, and also at a middle portion of the battery, wherein a portion of the negative electrode plate 1 has been removed. It should be noted also that the end of the parting angle piece 10 ends at the surface of the separator 14.

I claim:

1. A sealed, maintenance-free lead-acid storage battery of high capacity employing a thixotropic sulfuric acid gel as the electrolyte, comprising positive and negative electrode plates which are separated by a separator and connected to a positive and a negative terminal, respectively, and further comprising a gel layer on top of the electrode plates and therebetween, and having a free gas space on top of the gel layer, and a housing lid and a pressure relief valve confronting on said free gas space, and characterized by
   (a) the storage battery being horizontally arranged, the positive terminal thereof being disposed in the lower portion of said battery and said free gas space, and the pressure relief valve being disposed in the upper portion of said battery,
   (b) the lower portion of said free gas space containing the positive terminal being filled with electrolyte-resistant and electrolyte-impermeable material, and
   (c) a parting angle piece extending transversely across the free gas space, said angle piece operatively separating said upper portion of said free gas space from the lower, material containing portion thereof.

2. The storage battery as claimed in claim 1, characterized in that said material used in a single-component foam, especially polyurethane foam.

3. The storage battery as claimed in claim 1, characterized in that in the horizontal state of the storage battery the parting angle piece is slightly inclined downwardly towards the gel layer.

4. The storage battery as claimed in claim 3, characterized in that the parting angle piece has a front arm which is connected to the housing lid, and that the parting angle piece forms an upper boundary for said material, and the gel layer constitutes the internal boundary for said material, whereby the positive terminal is firmly sheathed in said material so that protection against corrosion thereof is obtained.

5. The storage battery as claimed in any one of the claims 1 to 4, characterized in that the upper boundary of the material extends at least beyond the region of the positive terminal and at most part way into the opposite superposed region of the negative terminal.

6. The storage battery as claimed in claim 1, characterized in that the electrodes are grid plate electrodes.

7. The storage battery as claimed in claim 3, characterized in that the parting angle piece protrudes into the gel layer.

8. The storage battery as claimed in claim 5, characterized in that the material fills 50% to 70% by volume of the entire, original free gas space.

9. The storage battery as claimed in claim 6, wherein the positive electrode is a tube-type electrode.

* * * * *